Oct. 27, 1964   A. PIERROT ET AL   3,154,493
MAGNETIC MATERIALS
Filed July 11, 1960   2 Sheets-Sheet 1
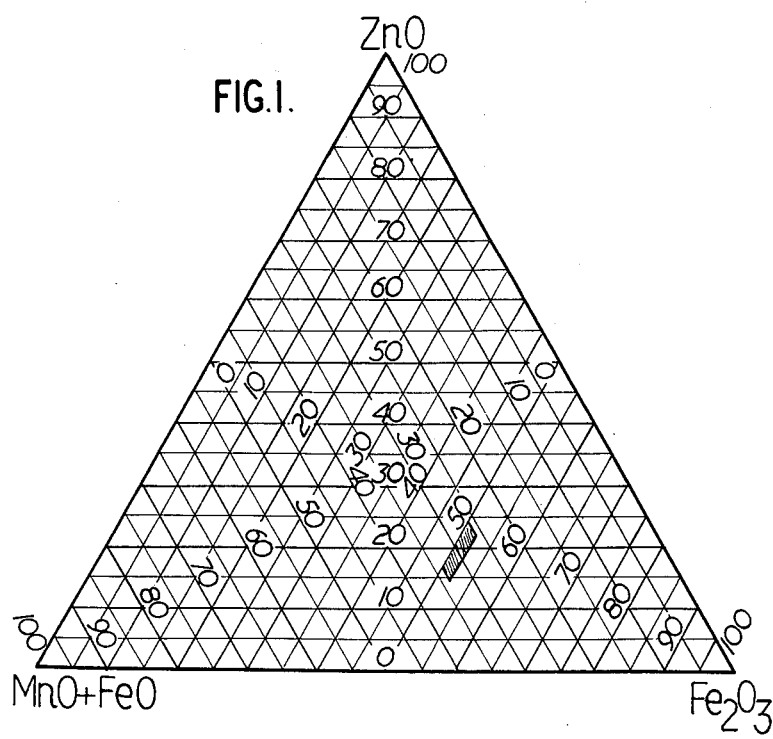
FIG.1.
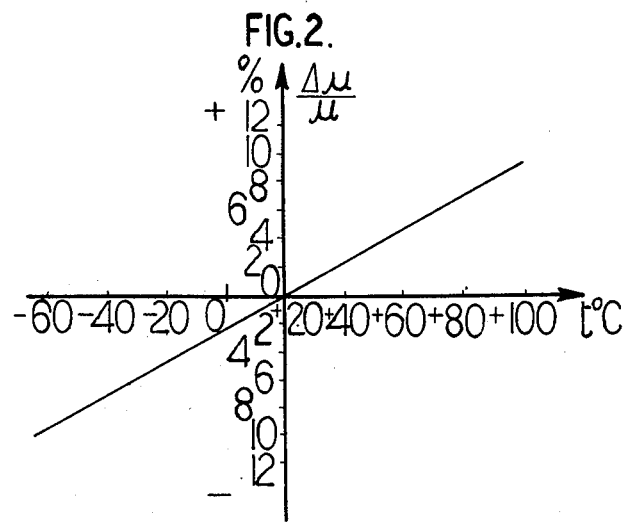
FIG.2.
Inventor
A. Pierrot -
Y. Lescroel
By 
Attorney 3,154,493
MAGNETIC MATERIALS
André Pierrot and Yves Lescroël, Conflans Sainte-Honorine, France, assignors to International Telephone and Telegraph Corporation, New York, N.Y., a corporation of Maryland
Filed July 11, 1960, Ser. No. 42,161
2 Claims. (Cl. 252—62.5)

The present invention relates to new magnetic materials with high permeability and low losses, particularly suitable for the art of telecommunication. These materials, usually known as ferrites, are mixed oxides of iron, manganese and zinc, forming solid solutions, prepared from fine powders of oxides of these metals, and these powders after mechanical preparation of a homogenous mixture, are compressed into cores of the desired geometrical shape; which are then subjected to a suitable heat treatment.

The object of the invention is to compensate, in electrical arrangements containing inductances and capacities, the variation of the reactance of an inductance as a function of the temperature variation by the variation of the reactance of a capacity in order to obtain, for example, resonant circuits for filters, oscillators, etc., of which the variation of the frequency of resonance with the temperature is as small as possible within a certain temperature range. Now, dielectric materials are known, such as polystyrol or certain ceramics, which have permissivities diminishing linearly when the temperature increases and which, in consequence, make it possible to produce capacitors of which the relative variation of the capacity as a function of the temperature is decreasing and linear. In order to obtain, for example, resonant circuits of which the resonance frequency is as independent as possible of the temperature, this variation of the capacity of the capacitors must be compensated by that of the inductance of the coils.

This compensation is obtained, in accordance with the invention, by using manganese and zinc ferrites in order to form the cores of the inductance coils. One process of preparation of manganese and zinc ferrites has already been described in U.S. patent application filed April 23, 1958, Serial No. 730,254. However, the applicants have found that certain manganese and zinc ferrites, manufactured in accordance with the process described in the above-mentioned application, by using certain well-defined contents of oxide constituents, present a coefficient variation of permeability with the temperature which is positive and constant within a certain temperature zone; magnetic cores, produced in an appropriate manner, with these ferrites, make it possible to obtain coils of which the relative variation of inductance with the temperature compensates the relative variation of the capacity of the capacitors associated with them. In the majority of cases, in order to produce inductance coils, the material is utilised in the form of a pot with air-gap, the latter being suitably determined in order to obtain the coefficient of variation of the inductance with the temperature prescribed in order to ensure the compensation of the capacity variation of a given capacitor.

The ferrites in accordance with the present invention constitute a very important advance on the ferrites known at the present time. For their manufacture, it is not necessary to use, at the start, oxides of very high purity, but, on the other hand, it is necessary to control the conditions of manufacture, very exactly at all stages, and to observe strictly the conditions of preparation described hereinafter.

The ferrites in accordance with the present invention are characterised by a final composition given by the formula:

$$(m\text{Fe}_2\text{O}_3,\ x\text{MnO},\ y\text{FeO},\ q\text{ZnO})$$

in which $m$, $x$, $y$, $q$ represent the molecular percentages of the components $(m+x+y+q=100\%)$.

These molecular percentages, according to the invention, must be comprised between the following narrow limits:

$$50\% < m < 52\%$$
$$24\% < x < 28\%$$
$$2\% < y < 6\%$$

Within these limits, all the combinations can be achieved; hence results that $q=100-(m+x+y)\%$.

The process of manufacture of the ferrites, in accordance with the invention, is described below and the properties and applications of these ferrites are then dealt with.

METHOD OF MANUFACTURE

The applicant utilises the following oxides in order to obtain the starting mixture: ferric oxide $\text{Fe}_2\text{O}_3$, mixed manganese oxide $\text{Mn}_3\text{O}$ and zinc oxide $\text{ZnO}$. It is unnecessary for these oxides to be of very high purity.

The mixture of oxides is obtained in a ball mill. The grinding time is determined by obtaining grains of which the largest size should be of the order of 0.005 millimetre. Usually a grinding period of 24 to 48 hours is sufficient.

After drying, the powder is then compressed at pressures of the order of 1 to 15 tons per cm.$^2$, preferably about 7 tons per cm.$^2$, with or without binding agent, which is then eliminated afterwards at a low temperature.

The annealing of cores so cmpressed is carried out at a temperature varying from 1,150° C. to 1,280° C., for a period of two to four hours, in a nitrogenous atmosphere containing 2 to 10% by volume of oxygen.

Slow cooling takes place within approx. 15 hours in pure nitrogen.

MAGNETIC PROPERTIES

The qualities of the material studied are characterised by:

The initial magnetic permeability $\mu$,
Coefficient of eddy-current losses $F_n$,
Coefficient of hysteresis losses $h$,
The coefficient of "trainage" losses by $t$ (residual losses),
The Q-factor,
The coefficient $\alpha_\mu$ of variation of the initial permeability $\mu$ with the temperature.

It should be understood that $\mu$ represents the initial magnetic permeability of the material constituting the core. The initial permeability of each sample is measured in a magnetising field of 2 millioersteds, for a frequency of 800 c./s. and at a temperature of 20° C.

To define the various loss coefficients, the formula:

$$R_{\frac{p}{L}} \pm F_n \cdot \frac{f^2}{800^2} + h \cdot \frac{N.I.}{l_{nm}} \cdot \frac{f}{800} + t \cdot \frac{f}{800}$$

is used, in which:

$R_p$ is the resistance due to losses in the ferrite core of an inductance coil in ohms;
$L$ is the inductance of this coil, in henrys;
$f$ is the frequency, in c./s;
$N$ is the number of turns of the winding of the coil;
$I$ is the effective value of the current in the winding, in amps.;
$l_{nm}$ is the length of the mean line of force, in cm.;
$F_n$ is the coefficient of eddy-current losses;
$h$ is the coefficient of hysteresis losses;
$t$ is the coefficient of trainage losses (residual losses).

The coefficient of eddy-current losses $F_n$ is expressed in ohms per henry, and related to the frequency of 800 c./s., but effectively measured between 100 and 200 kc./s., in a field sufficiently weak for the hysteresis losses to be negligible (for example: 2 millioersteds) and at a temperature of 20° C., for cores of which the cross-section is approx. $0.5 \times 0.6 = 0.3$ cm.$^2$.

The coefficient of hysteresis losses $h$ is expressed in ohms per henry, for a field N.I./$l_{nm}=1$ amp. turn/cm., related to the frequency of 800 c./s.; it is measured between the fields of 2 to 30 millioersteds, at 100 kc./s. and at 20° C.

The coefficient of "trainage" losses $t$, expressed in ohms per henry, referred to the frequency of 800 c./s., is deducted from the ordinate at the origin of the curves $$\frac{R_p}{f.L} = F(f)$$

for a very weak field and at a temperature of 20° C.

The coefficient of variation of the initial permeability with the temperature, between 20° C. and $t°$ C., relative to a continuous magnetic circuit, is expressed by:

$$\alpha_\mu = \frac{1}{t-20} \frac{\mu_t - \mu_{20}}{\mu_{20}}$$

This formula can also be written:

$$\frac{\mu_t - \mu_{20}}{\mu_{20}} = \frac{\Delta \mu}{\mu} = \alpha_\mu (t-20)$$

The main object of the present invention is to obtain magnetic materials having well-defined and easily reproducible variations of the initial permeability as a function of the temperature.

The present invention characterises, in particular, a material with a coefficient of variation of the permeability as a function of the positive and constant temperature between $-60°$ and $+100°$ C.

The invention will be described in greater detail by means of the following examples which are not of a limitative nature and with reference to the attached figures.

FIGURE 1 shows, on a triangular diagram, the composition of a magnetic material in accordance with the invention.

FIGURE 2 shows the variation of permeability for such a material between $-40°$ and $+100°$ C.

*Example 1*

Starting with oxides $Fe_2O_3$, $Mn_3O_4$, $ZnO$, containing less than 0.5% by weight of impurities, these oxides are ground and closely mixed in an iron mill with steel balls, for 24 hours, the molecular composition of the mixture before grinding being as follows:

53.5 $Fe_2O_3$, 26.0 $Mn_3O_4$, 20.5 $ZnO$ in molecular percentage.

The fact has been borne in mind, in choosing the percentage of $Fe_2O_3$, that the iron introduced by the mill, increases the molecular percentage of $Fe_2O_3$ by about 0.6%.

0.1% by weight of calcium has likewise been added in the form of calcium carbonate, or 0.2% $CaO$ in molecules.

The mixture is then pressed in toroidal form and subjected to a heat treatment at 1225° C., for four hours, in a pure nitrogenous atmosphere containing 5% oxygen by volume.

It is then cooled for 15 hours.

This ferrite has the following characteristics:

$\mu = 1500$ $\frac{F_n}{\mu} \cdot 10^3 = 0.10$ $\frac{h}{\mu^2} \cdot 10^6 = 500$ $\frac{t}{\mu} \cdot 10^3 = 5$ $\alpha_\mu = 0.120\%/°$ C. (between $-60°$ and $100°$ C.)

The variation $\Delta\mu/\mu$ of the permeability as a function of the temperature is shown in FIG. 2.

*Example 2*

An oscillatory circuit operating in the telephone band, exactly at 1,300 c./s., has been produced with an inductance coil having a magnetic pot-type core manufactured with the material described in Example 1 and a polystyrol capacitor.

The diameter of the pot is 26 mm. and its height 17 mm.

The air-gap is such that $\mu_e = 125$, or 0.27 mm. approx. $\mu_e$ is the effective permeability of the coil and is given by the formula.

$$\frac{1}{e} = \frac{1}{\mu} + \frac{e}{nm}$$

$e$ being the thickness of the air-gap.

The number of turns of the winding is 2,650.

The inductance, at the frequency of 1,300 c./s. is 2,800 mh.

The coefficient of temperature of the inductance is then $+100 \cdot 10^{-6}$ by ° C.

Figure 3:
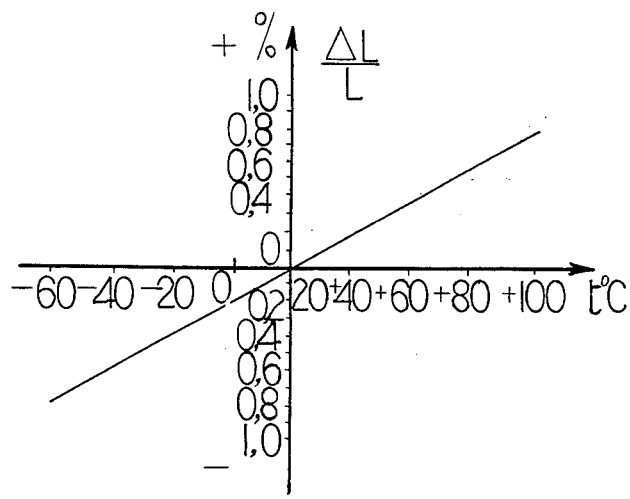
FIGURE 3 and FIG. 4 show the variations of $\Delta L/L$ and of $\Delta C/C$ as a function of the temperature for an inductance $L$ and a capacity $C$ which compensate each other.

The variation $\Delta L/L$ of the inductance with the temperature is shown in FIG. 3.

Figure 4:
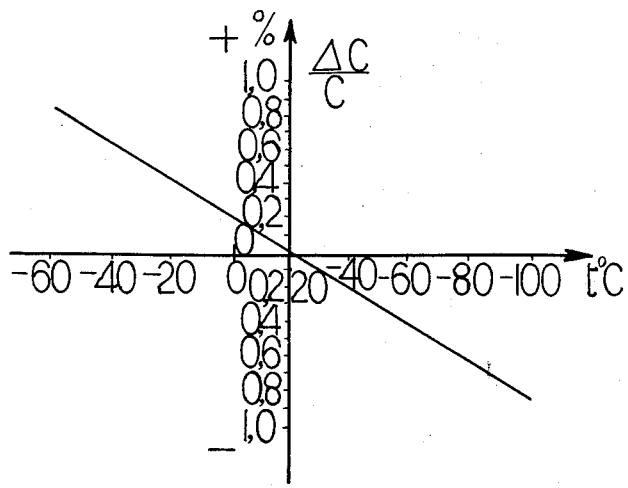

The coefficient of variation with the temperature of the capacity of the polystyrol capacitors being $$-100 \cdot 10^{-6}$$

the variation $\Delta C/C$ of the this capacity has the course shown in FIG. 4; in an extended temperature zone therefore, the variations of the inductance and the capacity are compensated; experience has shown that it is easy to maintain the frequency constant within 1%, between 0 and 50° C., for the oscillator obtained by using an inductance of this kind associated with a polystyrol condenser.

*Example 3*

In another embodiment, the same material, used in pot-type circuit with an effective permeability of 270, makes it possible to compensate the variation of capacity of a capacitor with a ceramic dielectric of coefficient $$-220 \cdot 10^{-6}$$

between $-60°$ and $+100°$ C. and to produce an oscillator operating between these temperatures and showing, at 2,000 c./s., a frequency variation less than $\pm 3$ c./s. between $-60°$ and $+100°$ C.

What is claimed is:

1. Ferromagnetic materials with very low losses at high frequencies, having a coefficient of variation of the permeability with the temperature positive and constant between $-60°$ and $+100°$ C., manufactured by compressing a homogeneous mixture of powder of metallic oxides having a maximum grain size of .0005 mm., at a pressure of 1 to 15 t./cm.$^2$, by subjecting the cores obtained to a heat treatment consisting of heating to a temperature of 1,150° to 1,280° C., in pure nitrogen, containing 2 to 10% by volume of oxygen, for a period of approximately 4 hours, followed by cooling slowly for approximately 15 hours, in pure nitrogen, said mixture being composed of ferric oxide, manganese oxide and zinc oxide containing up to .5% by weight of impurities, of which the final compositions comply with the formula:

$$m\text{Fe}_2\text{O}_3, x\text{MnO}, y\text{FeO}, q\text{ZnO}$$

in which the molecular percentages $m, x, y, q$, satisfy the following relations:

$$m+x+y+q=100$$
$$50\% < m < 52\%$$
$$24\% < x < 28\%$$
$$2\% < y < 6\%$$

2. Ferromagnetic materials as claimed in claim 1 in which there is added less than 1% by weight of calcium to the mixture before grinding.

References Cited in the file of this patent

UNITED STATES PATENTS

| | | |
|---|---|---|
| 2,439,809 | Hunter | Apr. 20, 1948 |
| 2,551,711 | Snoek et al. | May 8, 1951 |
| 2,579,978 | Snoek et al. | Dec. 25, 1951 |
| 2,707,001 | Hathaway | Apr. 26, 1955 |
| 2,852,682 | Icenbice | Sept. 16, 1958 |
| 2,886,529 | Guillaud | May 12, 1959 |
| 2,903,429 | Guillaud | Sept. 8, 1959 |